March 8, 1949. H. T. ENGSTROM 2,463,528
BEARING EVALUATOR

Filed Oct. 11, 1945 2 Sheets-Sheet 1

Inventor
HOWARD T. ENGSTROM

By M. O. Hayes

Attorney

March 8, 1949.  H. T. ENGSTROM  2,463,528
BEARING EVALUATOR

Filed Oct. 11, 1945  2 Sheets-Sheet 2

$D = .025 + .00555\, n^2$

Inventor
HOWARD T. ENGSTROM

By  M. O. Hayes

Attorney

Patented Mar. 8, 1949

2,463,528

UNITED STATES PATENT OFFICE 2,463,528

BEARING EVALUATOR

Howard T. Engstrom, United States Navy

Application October 11, 1945, Serial No. 621,649

3 Claims. (Cl. 35—10)

(Granted under the act of March 3, 1883, as amended April 30, 1928; 370 O. G. 757)

This invention relates to an improved method of determination of a best estimated position from directional bearings such as those obtained from radio direction finders.

A principal object is to provide a method of combining information from a number of bearings into a single best estimated position.

Another object is to provide a mechanical method whereby an operator may combine this information.

Other objects will become apparent from the following specification taken into conjunction with the appended claims.

The gnomonic charts, which are used in plotting bearings, have the property that the bearings are represented by straight lines. Due to unavoidable inaccuracies and errors, the bearings in a particular case do not pass through the fixed point but are spread out in various configurations. The evaluation of the most probable position of the fix from these configurations depends upon the application of statistics of the errors of bearings. The problem has many complexities and various assumptions must be made if the fix is to be derived within a reasonably short period of time. Moreover, it is particularly important to note that the so-called best estimated position, which is supposed to be the point of maximum probability, is usually not well defined. One can usually define an area centered about the best estimated position through which the probabilities do not differ significantly far from that for the best estimated position. It should be emphasized that almost any point within this area represents a potential location of the fix. Since this area of uncertainty is rarely circular, it is as important to determine its size and shape as it is to find the best estimated position, which represents the location of the center. The fan method described below is a mechanical method of applying least-squares to the determination of the best estimated position and the area of uncertainty surrounding it.

The invention may be more easily understood by the following description in connection with the accompanying drawings in which.

Figure 1:
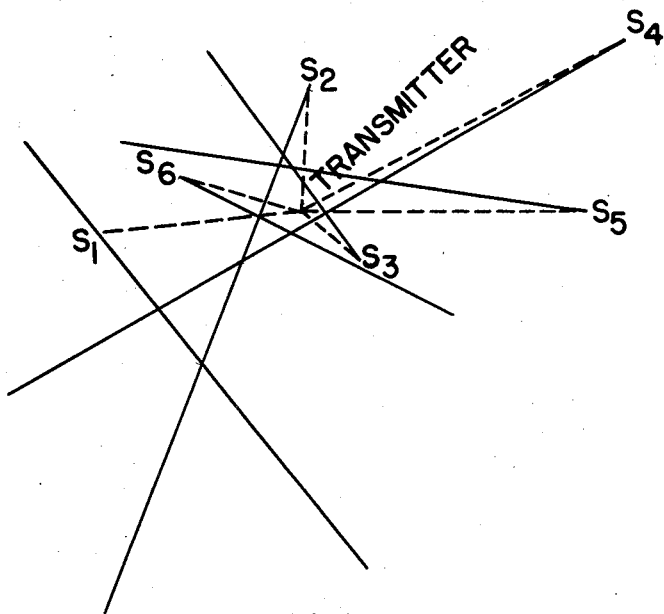
Figure 1 is a chart showing bearings taken on an unknown transmitter.

Figure 1, known as the direction finder plot, presents the problem graphically. The black lines are the observed or direction finder bearings taken on a transmitting unit from the direction finder stations $S_1$, $S_2$, . . . $S_6$. These bearings cross each other in scattered points as they do on a tracking chart. The problem is to find the probable fix or position of the transmitter from this set of intersections. The method should be as objective as possible, in order to prevent the introduction of systematic errors.

If there were no errors in the direction finder bearings taken on the transmitting unit the bearings would all intersect in one point at the transmitter. The dotted lines in Figure 1 represent such an ideal set of bearings. The angle between the observed and actual bearing for any one station is known as the bearing error or angular deviation. This angle will be large when the observed bearing is far from the actual bearing as is the case at $S_1$, and small when the observed bearing is near the actual bearing as is the case at $S_4$ or $S_5$. When there is no error the angle will be zero, and the actual and observed bearings will coincide. The dependence of error upon the distance of the station from the fix should be noted. We may define the most probable position of the fix as that point for which the sum of the squares of the angular deviations, or bearing errors, is at a minimum. Hence the name least-squares.

The principle of least-squares is applicable, however, only when it is permitted to suppose that systematic errors are absent and when the existing errors of measurement follow the Gaussian law for random distribution of errors. The prevalence of so-called wild bearings show that this condition is not in general satisfied because there are many more such errors than the Gaussian law would permit. Hence, the proper procedure, or at least the best we can achieve under the circumstances, is to disregard the wild bearings, which we may rather arbitrarily define as those for which the error is in excess of 15 degrees.

Figure 2:
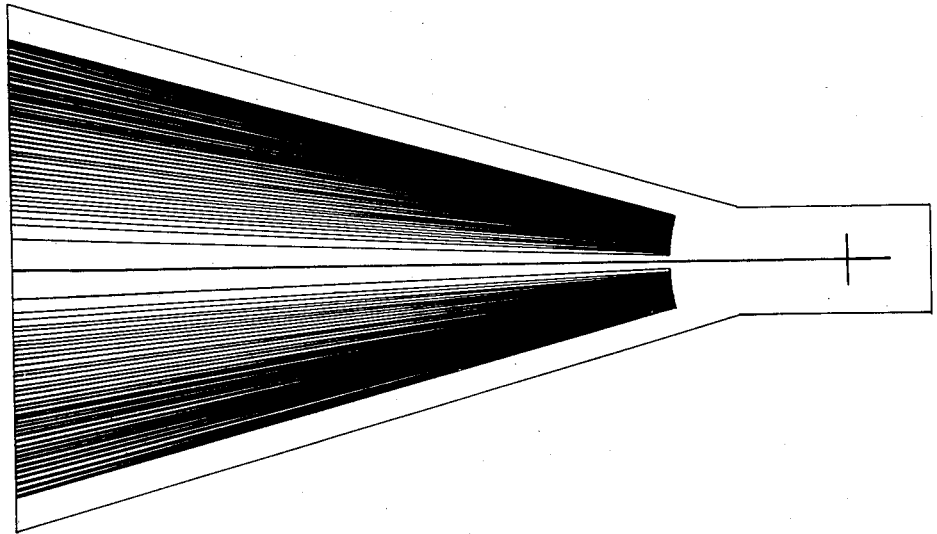
Figure 2 illustrates the variable density fan used.

Figure 2 is a diagram of a density, or direction finding, fan constructed from photographic film as follows. A glance at the figure will reveal that a center line cut by a small cross-bar extends the length of the fan. On either side of this center line, the fan is divided into 15 one-degree sectors, each shaded so that the intensity of light passing through the fan decreases in steps as the square of the angular deviation from the central radius. The amount of shading or density of each sector is given by the formula $D = 0.025 + 0.00555 N^2$, where $N$ is the angular deviation from the center line. The quantity, 0.025, is the density of the central sector of the fan; whereas, the factor, 0.00555 was determined experimentally as producing satisfactory transmission with a number of superimposed fans. The fact that the density of the central sector of the fan is 0.025 rather than 0.000 introduces no error because the effect merely reduces the over-all intensity of the transmitted light.

Figure 3:
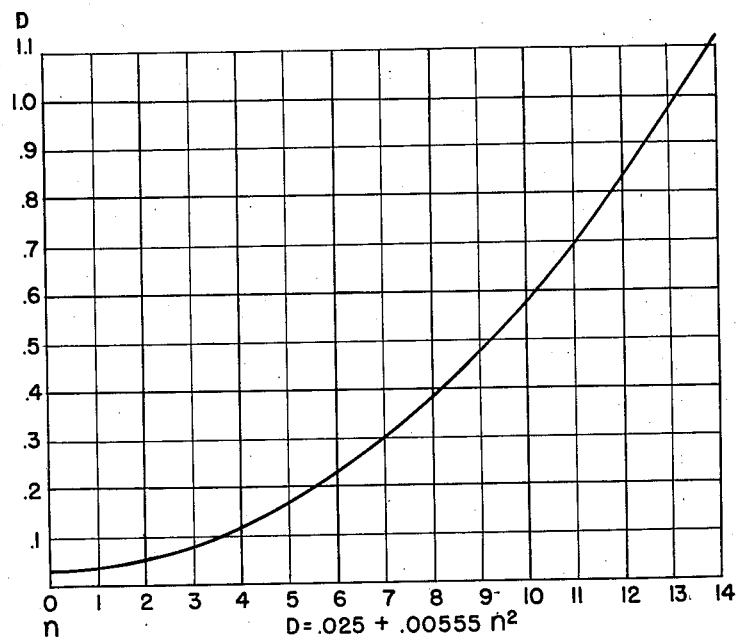
Figure 3 is a graph of the equation for density.

Figure 3 is a graph of the equation $$D = .025 + .00555N^2$$

The density, D, is plotted vertically and varies in steps from .025, the density of the center of the fan, to 1.11, the density of the edge of the fan. Since bearings that deviate more than 15° from the true bearing are considered outside the normal range of error, N, the angular deviation, varies only from 0 to 14.

The intensity of transmitted light, I, for a single fan follows the law:

$$I = I_0 10^{-D}$$

where $I_0$ is the intensity of the light incident on the fan. When a number of fans are superposed at a point where the respective densities are $D_1, D_2, D_3 \ldots D_N$, the transmitted light has the intensity $$I = I_0 10^{-(D_1 + D_2 + D_3 \ldots D_N)}$$

The greatest transmission will, therefore, occur for that point where the sum $D_1 + D_2 + D_3 \ldots D_N$ has its least value. Since the D scale on the fans varies with square of the angular deviation, the point of greatest transmission will be that for which the sums of the squares of the bearing errors is least. Thus, the point of greatest transmission represents the least-square solution of the problem.

By setting $$I_0' = I_0 10^{-0.025N}$$

we have $$I = I_0' 10^{-0.00555 \Sigma n_i^2}$$

and will be a maximum when $\Sigma n_i^2$ has its least value as required. The determination of the point of greatest transmission is thus independent of $I_0'$, i. e., it is unaffected by the fact that the background fan density is not zero.

Since the accuracy of the fan fix is directly dependent on the reliability of the bearings covered by the fans, the choice of good bearings becomes one of the operator's most important tasks. An explanation of the comparative reliability of bearings will not be given here. Some of the many factors that must be considered are: the distance from the station to the probable fix, the type of wave, ground or air, the reputation of the direction finder stations for reliable bearings, and weather conditions. Very unreliable bearings pass far from the area on the chart where most of the bearings intersect. These are known as wild bearings and, as previously noted, are not used in the calculation of the fix because deviations greater than 15° do not follow the error law.

The operator tapes the tracking chart to a glass-topped table lighted from below by a fluorescent light. He then places a fan over a reliable bearing, plotted in red on the chart, so that the center line of the fan lies along the bearing with the cross-bar of the fan at the direction finding station. Since a fan shaded its complete length would inevitably cover more bearings than is desirable, a fan shaded 3, 4½, or 6 inches from the top is frequently used to cover a bearing which lies in an area where a great number of bearings intersect.

If the fans have been placed carefully over a sufficient number of reliable bearings which cross each other at large angles from many different directions, a small illuminated elliptical area will show through the fans on the chart. The center of this area is taken as the most probable position of the fix, and the area itself is representative of the uncertainty of the fix.

Usually the area will range from a small circle to a long narrow ellipse according to the number of bearings used and the angles at which they cross. If the ellipse is greatly elongated or open at the end when all the reliable bearings have been used, the operator may obtain a more clearly defined area by applying the fans to the less reliable bearings. Care must be taken, however, not to use wild bearings which distort or completely black out the elliptical figure. The best fixes, of course, are those for which the illuminated area is small and completely closed.

The operator records the center of the ellipse by placing on the chart an instrument consisting of a steel arm attached to a vertical rod mounted on a heavy steel base. After indicating the center, he removes the fans, and marks the best estimated position and estimated area of uncertainty upon the chart.

Figure 4:
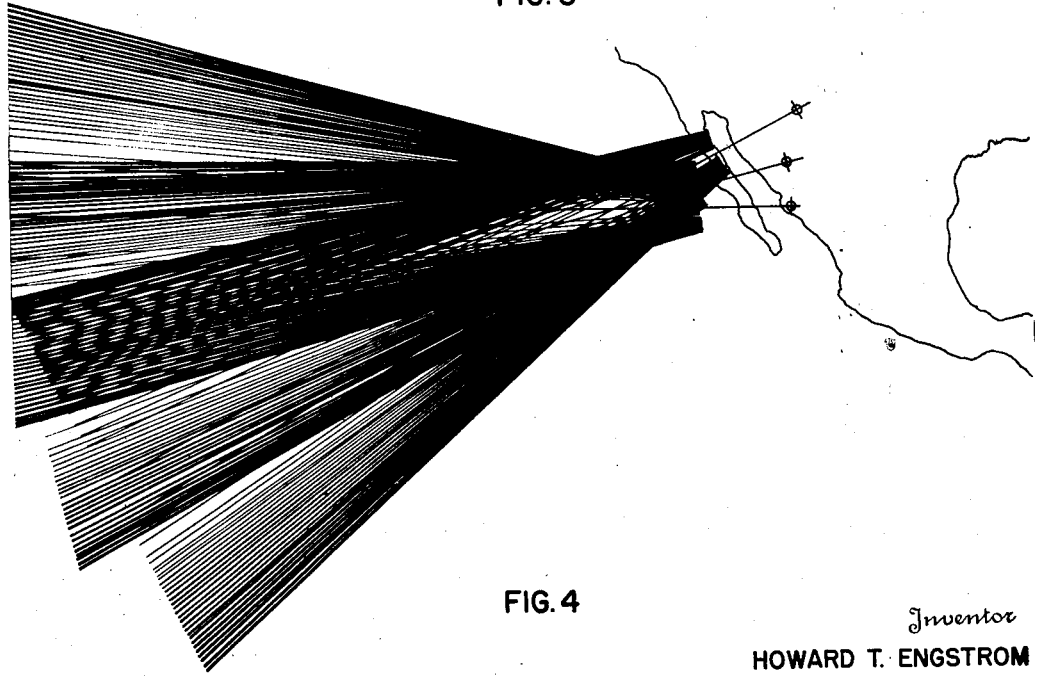
Figure 4 is a chart with a number of the fans of Figure 2 placed thereon.

Figure 4 is a diagram of a tracking chart with the fans placed over the bearings and an elongated elliptical area showing through on the chart. Only a few bearings are illustrated in this figure, but in actual practice more would be used to increase accuracy.

Frequently a small clearly defined ellipse will be obtained from only a few bearings. Although the ellipse may be clearly defined, a fix obtained from too few bearings is not likely to be accurate.

As was implied above, no hard and fast rules can be given for finding a probable fix by the fan method. The process is not mechanical, and it is advisable for the operator to have some experience and skill, particularly in the choice of bearings and the determination of a center point to guard against the introduction of errors arising out of the empirical nature of the method.

Since a fan covering a wild bearing will distort or completely black out the lighted elliptical area, wild bearings should be eliminated. Unfortunately, there is no simple criterion for determining when a bearing is really wild. The operator must make an arbitrary decision from inspection of the direction finding plot. Frequently the omission or inclusion of a doubtful bearing may greatly influence the resultant fix, particularly when it is a solitary bearing that cuts sharply across many bearings whose angle of intersection is small. The wild bearing problem is a difficulty inherent in all fix methods.

As has already been stated, direction finding bearings which are arcs of great circles on the surface of the earth, are represented by straight lines on a gnomonic projection. In order to plot a bearing on a gnomonic chart a compass rose must be used for each station. Because of the inevitable distortion on a flat map, the degree intervals are not uniformly spaced as for an ordinary compass, whereas the fan has a uniform angular spacing. Accordingly, the fan coordinates will agree with those of the chart rose only on the average.

The effects of the rose distortion could be overcome through the using of different fans for each bearing with angular deviations on the fans corresponding to those on the rose, but this usually entails the use of too many types of fans.

In some cases, it may be desirable to weight bearings in proportion to their reliability. Since the shaded sectors have equal density on each fan, reliable bearings ordinarily receive the same weight as less reliable ones. To correct this two or three fans should be placed over the reliable bearings and a single fan over the less reliable bearings to give a uniform system of weighting.

The fan method, if applied carefully by a trained operator, will lead to results nearly as satisfactory as those obtained by the more accurate least-squares method, especially when the bearings are well distributed. The method is definitely superior to the common subjective procedure wherein the operator merely marks the center of gravity of the intersections, without proper evaluation of distances from the stations and many other effects that tend to influence the best estimated position.

The invention described herein may be manufactured and used by or for the Government for governmental purposes without the payment of any royalty thereon.

What is claimed is:

1. A device for accurately fixing a position from a series of direction finder station bearings comprising, a chart with said bearings plotted thereon, a plurality of screens, each having its central linear axis aligned over one bearing and an indicating mark on said axis superposed on the related direction finder station and having areas on both sides of its central linear axis increasingly shaded in proportion to the square of the angular deviation from said axis using said indicating mark as a center, whereby a restricted area of minimum shading substantially symmetrically encompasses said position on said chart.

2. A device for use in taking bearings comprising a translucent element provided with a central linear axis line and an indicating mark on said line and shading on the areas of said element on both sides of said central axis line which increases in opacity in proportion to the square of the angular deviation from said central axis line about said indicating mark as a center.

3. The device of claim 2, in which said shaded areas are limited to a segment of less than ninety degrees and terminate short of said indicating mark.

HOWARD T. ENGSTROM.

REFERENCES CITED

The following references are of record in the file of this patent:

UNITED STATES PATENTS

| Number | Name | Date |
|---|---|---|
| 1,351,756 | Irwin | Sept. 7, 1920 |
| 1,883,884 | Doran | Oct. 25, 1932 |
| 2,233,255 | Friedell | Feb. 25, 1941 |
| 2,370,305 | Guditz | Feb. 27, 1945 |
| 2,380,244 | Jones et al. | July 10, 1945 |